(12) United States Patent
Cho et al.

(10) Patent No.: US 8,798,027 B2
(45) Date of Patent: Aug. 5, 2014

(54) APPARATUS AND METHOD FOR COMMUNICATING CONTROL INFORMATION IN BROADBAND WIRELESS ACCESS (BWA) SYSTEM

(75) Inventors: Hee-Kwun Cho, Incheon (KR); In-Seok Hwang, Seoul (KR); June Moon, Seoul (KR); Soon-Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1343 days.

(21) Appl. No.: 11/774,851

(22) Filed: Jul. 9, 2007

(65) Prior Publication Data

US 2008/0009285 A1 Jan. 10, 2008

(30) Foreign Application Priority Data

Jul. 7, 2006 (KR) .................. 10-2006-0064123
Jun. 12, 2007 (KR) .................. 10-2007-0057419

(51) Int. Cl.
*H04B 7/212* (2006.01)
*H04W 72/00* (2009.01)

(52) U.S. Cl.
USPC ......................................... 370/348; 455/451

(58) Field of Classification Search
USPC .............. 455/450–452.2, 464, 434–444, 509, 455/524–525; 370/328–338, 395.4–395.41, 370/348
See application file for complete search history.

(56) References Cited

U.S. PATENT DOCUMENTS

| | | | |
|---|---|---|---|
| 6,628,952 B1 | 9/2003 | Hankins et al. | |
| 6,804,527 B2 | 10/2004 | Struhsaker et al. | |
| 7,002,929 B2 | 2/2006 | Struhsaker et al. | |
| 2004/0174845 A1* | 9/2004 | Koo et al. | 370/328 |
| 2005/0101328 A1* | 5/2005 | Son et al. | 455/436 |
| 2005/0288026 A1 | 12/2005 | Byun et al. | |
| 2006/0030309 A1* | 2/2006 | Lee et al. | 455/422.1 |
| 2007/0177545 A1* | 8/2007 | Natarajan et al. | 370/331 |
| 2007/0218889 A1* | 9/2007 | Zhang et al. | 455/422.1 |
| 2008/0051086 A2* | 2/2008 | Etemad et al. | 455/436 |

OTHER PUBLICATIONS

Jonny Sun et al., "Quality of Service Scheduling for 802.16 Broadband Wireless Access Systems", Vehicular Technology Conference, VTC 2006—Spring, May 7, 2006.

* cited by examiner

*Primary Examiner* — Christopher M Brandt
(74) *Attorney, Agent, or Firm* — The Farrell Law Firm, P.C.

(57) ABSTRACT

Control information communicating apparatus and method in Broadband Wireless Access (BWA) system are provided. A Base Station (BS) includes a manager for managing UL control region allocation information of adjacent BSs; a scheduler for scheduling resources and controlling periodic transmission of UL control region allocation information when a UL control region of the BS is the same as UL control regions of the adjacent BSs; and a control information generator for periodically generating the UL control region allocation information under the control of the scheduler.

21 Claims, 11 Drawing Sheets

APPARATUS AND METHOD FOR COMMUNICATING CONTROL INFORMATION IN BROADBAND WIRELESS ACCESS (BWA) SYSTEM

PRIORITY

This application claims priority under 35 U.S.C. §119(a) to an application filed in the Korean Intellectual Property Office on Jul. 7, 2006 and assigned Serial No. 2006-64123, and an application filed in the Korean Intellectual Property Office on Jun. 12, 2007 and assigned Serial No. 2007-57419, the contents of which are incorporated herein by reference.

BACKGROUND OF THE INVENTION

1. Field of the Invention

The present invention relates generally to an apparatus and method for communicating control information in a Broadband Wireless Access (BWA) system, and in particular, to an apparatus and method for periodically communicating unchangeable control information in a BWA system.

2. Description of the Related Art

A number of radio communication technologies have been suggested as a candidate for rapid mobile communications. Among the suggested technologies, an Orthogonal Frequency Division Multiplexing (OFDM) scheme is the most dominant next-generation radio communication technology. In the future, it is anticipated that the OFDM technology will be adopted to most of the radio communication technologies. Wireless Metropolitan Area Network (WMAN) of Institute of Electrical and Electronics Engineers (IEEE) 802.16, which is called the 3.5G technology, is adopting the OFDM technology as the standard.

To effectively and freely allocate uplink/downlink in a OFDM based Broadband Wireless Access (BWA) system, a Base Station (BS) transmits information indicative of uplink/downlink resource allocation of the uplink/downlink in every frame. In IEEE 802.16 systems, a (MAP message is used to carry this information.

Figure 1:
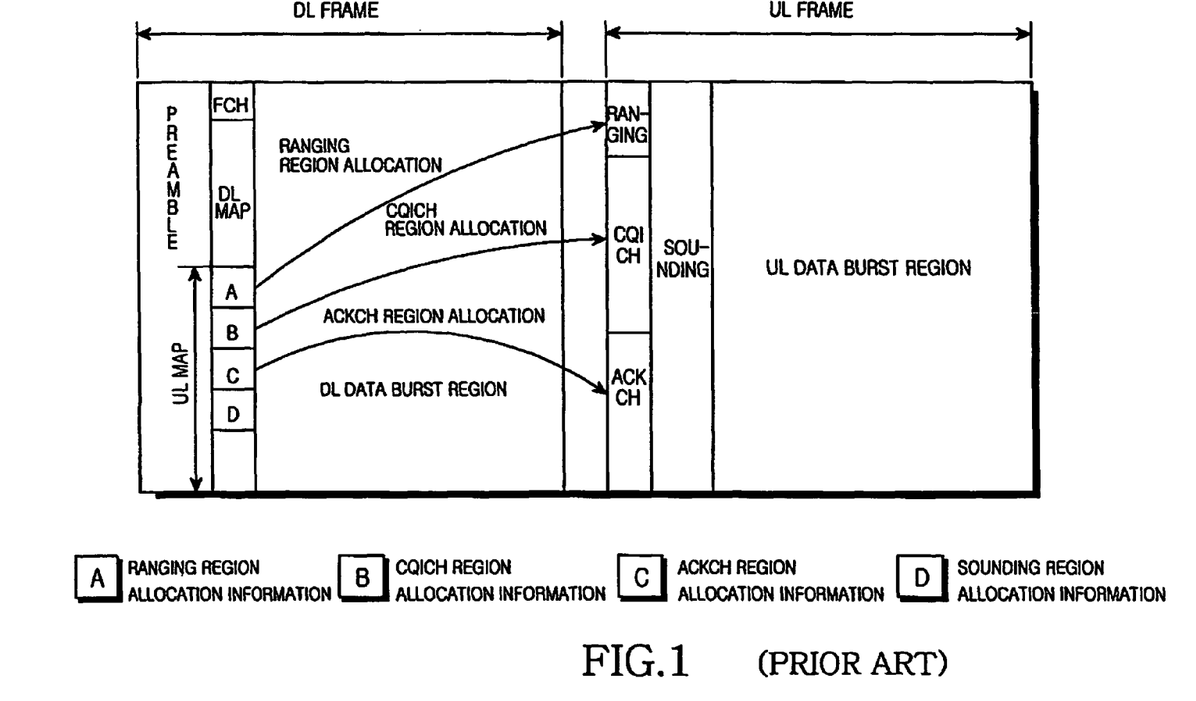
FIG. 1 illustrates a typical frame structure of an IEEE 802.16 system.

FIG. 1 illustrates a typical frame structure of the IEEE 802.16 system.

The frame of FIG. 1 includes a DownLink (DL) frame and an UpLink (UL) frame. The DL frame carries data from BS to Mobile Stations (MSs). The UL frame carries data from MSs to BS in designated regions.

The DL frame includes a preamble, a Frame Control Header (FCH), a DL MAP, a UL MAP, and DL data bursts. The UL frame is divided largely to a control region and a UL data burst region. The DL preamble is used for an initial synchronization acquisition and a cell search of the MS. The FCH contains information indicative of a basic structure of the frame. The DL MAP contains information indicative of the DL data burst regions. The UL MAP contains information indicative of the structure of the UL frame.

The control region of the UL frame includes a ranging region, a Channel Quality Information CHannel (CQICH) region, an ACKnowledgment Channel (ACKCH) region, and a sounding region. The ranging region, in which the MS can upload codes without the allocation from the BS, includes an initial ranging region and a periodic ranging region. The ranging region is used to perform a network initial access, request a handoff, or request a resource allocation. CQICH region is used for MS to report of DL channel condition. ACKCH region is used to report of whether the DL data bursts are successively received. The sounding region carries a sounding signal for a UL channel estimation.

In general, the frame structure is defined by the BS. The MS can acquire frame structure and allocation information by receiving DL MAP and UL MAP of the DL frame from the BS in every frame.

As above, while the frame structure is dynamically changed according to the specification, it scarcely changes in the actual system and every frame retains the same structure. Usually, the UL control region such as the ranging region, the CQICH region, and the ACKCH region in FIG. 1 is not changed. Accordingly, it is considerable loss in terms of the efficiency of the resource utilization to transmit the allocation information relating to this fixed region in every frame.

In practice, in an IEEE 802.16e system, the amount of resources used to describe the UL control region is 212 bits in total: 104 bits of the ranging region, 52 bits of the CQICH region, and 56 bits of the ACKCH region. The 212-bit information amount corresponds to two OFDM symbols in size when it is encoded at 1/12. Typically, when MAP information occupies 6-10 OFDM symbols, it can be said that the allocation information of the UL control region occupies more than 20% in the MAP information. Since the conventional system cannot utilize the region occupied by the allocation information of the UL control region as the UL data burst region, a loss of about 10% occurs in the system capacity.

As discussed above, what is needed is a method for effectively transmitting allocation information relating to the unchangeable region (UL control region) in the frame structure.

SUMMARY OF THE INVENTION

An aspect of the present invention is to substantially solve at least the above problems and/or disadvantages and to provide at least the advantages below. Accordingly, an aspect of the present invention is to provide an apparatus and method for reducing a size of control information in a BWA system.

Another aspect of the present invention is to provide an apparatus and method for periodically communicating unchangeable control information in a BWA system.

A further aspect of the present invention is to provide an apparatus and method for efficiently constituting a MAP in a BWA system.

A further aspect of the present invention is to provide an apparatus and method for reducing a size of a UL MAP in a BWA communication system.

A further aspect of the present invention is to provide an apparatus and method for transmitting allocation information relating to UL control regions by periods in a BWA communication system.

A further aspect of the present invention is to provide an apparatus and method for separately controlling transmission periods of allocation information relating to UL control regions in a BWA communication system.

A further aspect of the present invention is to provide an apparatus and method for broadcasting UL control region allocation information of an adjacent BS to an MS in a BWA communication system.

A further aspect of the present invention is to provide an apparatus and method for an MS acquiring UL control region allocation information of a target BS from a former BS prior to its handover in a BWA communication system.

The above aspects are achieved by providing a BS in a BWA system, which includes a manager for managing UL control region allocation information of adjacent BSs; a scheduler for scheduling resources and controlling periodic transmission of UL control region allocation information when a UL control region of the BS is the same as UL control regions of the adjacent BSs; and a control information generator for periodically generating UL control region allocation information under the control of the scheduler.

According to one aspect of the present invention, an MS in a BWA system includes a control information interpreter for determining whether control information received from an BS includes UL control region allocation information; a manager for managing UL control region allocation information fed from the control information interpreter; and a control signal transmitter for performing UL signaling using the latest UL control region allocation information managed by the manager when control information of a current frame does not contain UL control region allocation information.

According to another aspect of the present invention, a BS in a BWA system includes a manager for collecting UL control region allocation information from adjacent BSs and generating a broadcasting message which includes the UL control region allocation information of the adjacent BSs; and a transmitter for broadcasting the broadcasting message fed from the manager.

According to a further aspect of the present invention, an MS in a BWA system includes a manager for extracting and storing UpLink (UL) control region allocation information of an adjacent Base Station (BS) from a broadcasting message received from a BS; and a transmitter for acquiring UL control region allocation information of a target BS from the manager when the MS is handed over, and attempting to access the target BS using the acquired UL control region allocation information.

According a further aspect of the present invention, a communicating method of a BS in a BWA system includes collecting and storing UL control region allocation information from adjacent BSs; and when a UL control region of the BS is the same as UL control regions of the adjacent BSs, periodically transmitting UL control region allocation information.

According a further aspect of the present invention, a communicating method of an MS in a BWA system includes determining whether control information received from a BS contains UL control region allocation information; and when there is no UL control region allocation information, performing UL signaling using the most recently received UL control region allocation information.

According a further aspect of the present invention, a communicating method of a BS in a BWA system includes collecting and storing UL control region allocation information from adjacent BSs; generating a broadcasting message which includes the UL control region allocation information of the adjacent BSs; and broadcasting the generated broadcasting message.

According a further aspect of the present invention, a communicating method of an MS in a BWA system includes extracting and storing UL control region allocation information of an adjacent BS from a broadcasting message received from a BS; acquiring UL control region allocation information of a target BS from the stored information when the MS is handed over; and attempting to access the target BS using the acquired UL control region allocation information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for reducing a size of an UpLink (UL) MAP in a Broadband Wireless Access (BWA) system.

As discussed earlier, a frame structure of the BWA system does not always change but maintains the same structure in every frame. Particularly, UL control regions; that is, the ranging region (including the initial ranging region and the periodic ranging region), the CQICH region, and the ACKCH region do not always change but maintain the same structure in every frame. The present invention aims to transmit allocation information relating to the UL control regions periodically or when the information is changed, rather than in every frame.

However, when the allocation information relating to all of the UL control regions is transmitted by set periods (several frames), MAP overhead can be mitigated but additional delay may occur in a handover.

Figure 2:
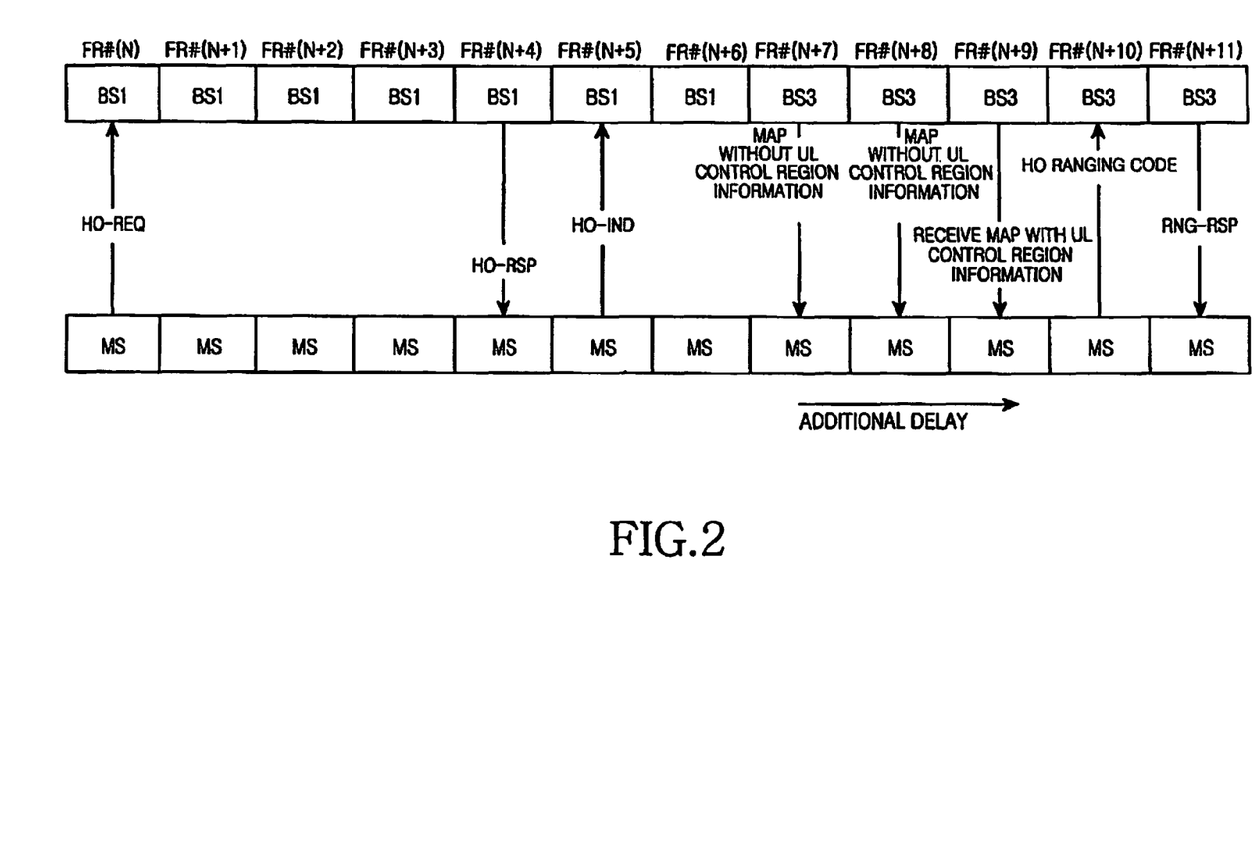
FIG. 2 illustrates additional handover latency in periodic transmission of UL control region allocation information.

FIG. 2 illustrates additional handover latency in periodic transmission of UL control region allocation information.

In FIG. 2, as determining the necessity of handover, an MS transmits a HandOver REQuest (HO-REQ) message to a BS1 in an n-th frame Fr#(n). The BS1 transmits a HandOver ReSPonse (HO-RSP) message to the MS in response to the HO-REQ message in an (n+4)-th frame. The MS transmits a HandOver INDication (HO-IND) message to the BSI in an (n+5)-th frame and attempts the access to a BS3.

In doing so, if BS3 sends UL control region allocation information in every frame, the MS can transmit an HO ranging code in an (n+8)-th frame. However, in the periodic transmission as shown in FIG. 2, since the MS receives the UL control region allocation information in an (n+9)-th frame, the MS cannot transmit the HO ranging code until in an (n+10)-th frame. In other words, when the allocation information relating to all of the UL control regions is periodically transmitted, such additional handover latency is expected.

In this respect, the present invention provides a method for reducing MAP overhead by transmitting MAP information periodically and preventing the additional handover latency as above.

Embodiments of the present invention are now described in detail by referring to the drawings.

Figure 3:
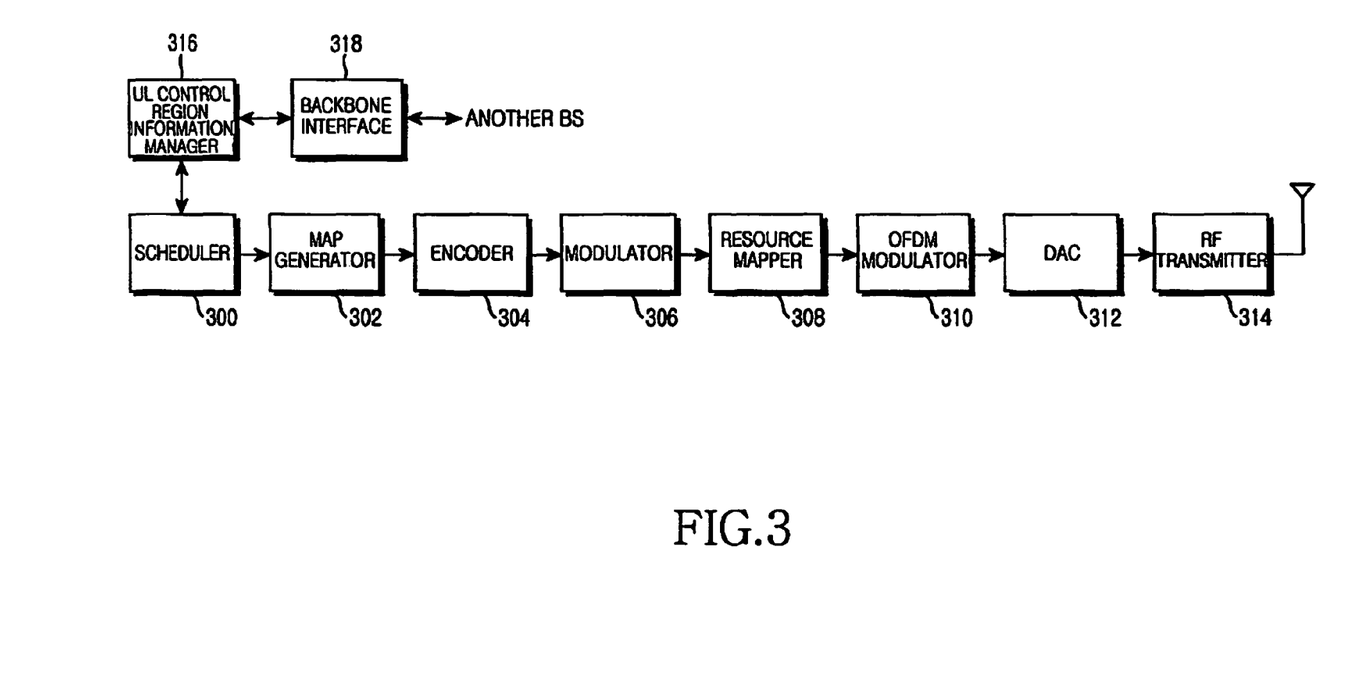
FIG. 3 illustrates constitution of a BS in a BWA system according to the present invention.

FIG. 3 illustrates a constitution of a BS in a BWA system according to the present invention.

The BS of FIG. 3 includes a scheduler 300, a MAP generator 302, and encoder 304, a modulator 306, a resource mapper 308, an Orthogonal Frequency Division Multiplexing (OFDM) modulator 310, a Digital-to-Analog Converter (DAC) 312, a Radio Frequency (RF) transmitter 314, a UL control region formation manager 316, and a backbone interface 318.

The scheduler 300 of FIG. 3 schedules resources using MS channel information (Channel Quality Indicator (CQI) information) fed back over a feedback channel (e.g., CQI channel), and provides a scheduling result (resource allocation information, control information, etc.) to the MAP generator 302. According to the present invention, the scheduler 300 controls a transmission period of the UL control region allocation information.

The MAP generator 302 generates MAP information (DL MAP/UL MAP) according to the scheduling result provided from the scheduler 300. According to the present invention, the MAP generator 302 adds the UL control region allocation information to the MAP information according to preset periods under the control of the scheduler 300 or another controller (not shown). When the UL control region allocation information is changed, the MAP generator 302 adds the UL control region allocation information to the MAP information over a preset number of frames under the control of the scheduler 300.

The encoder 304 generates coded symbols by encoding information bit stream fed from the MAP generator 302. For example, the encoder 304 can use a Convolutional Code (CC), a Block Turbo Code (BTC), a Convolutional Turbo Code (CTC), a Zero Tailing Convolutional Code (ZT-CC), and the like. The modulator 306 generates modulated symbols by modulating the coded symbols fed from the encoder 304 using a certain modulation scheme. Since the MAP information needs to be received at every MS, it is assumed that the MAP information is coded and modulated using a robust modulation scheme (e.g., Quadrature Phase-Shift Keying (QPSK), R=1/2, Repetition=6).

The resource mapper 308 maps the data fed from the modulator 306 to a preset resource (e.g., front region of a frame) and outputs the mapped data. The OFDM modulator 310 generates OFDM symbols by OFDM-modulating the mapped data fed from the resource mapper 308. Herein, the OFDM modulation includes an Inverse Fast Fourier Transform (IFFT) operation, a Cyclic Prefix (CP) insertion, etc.

The DAC 312 converts the sample data fed from the OFDM modulator 310 to an analog signal and outputs the analog signal. The RF transmitter 314 converts the baseband signal fed from the DAC 312 to an RF signal and transmits the RF signal over an antenna. Receiving the MAP, MSs receive DL data from the BS and send UL data to the BS.

In the mean time, the UL control region information manager 316 manages UL control region allocation information of the BS and UL control region allocation information of adjacent BSs. The backbone interface 318 provides UL control region allocation information received from the adjacent BSs over the backbone network to the UL control region information manager 316, and transmits the BS UL control region allocation information provided from the UL control region information manager 316 to the adjacent BSs. In doing so, the BS UL control region allocation information can be transmitted to the adjacent BSs by periods or when the information is changed.

According to an embodiment of the present invention, the UL control region information manager 316 determines an allocation information transmission period of the initial ranging region by comparing the UL control region information collected from the adjacent BSs and its own UL control region allocation information. When any one of the adjacent BSs has a different UL control region, the UL control region information manager 316 sets the allocation information transmission period of the initial ranging region of the UL control regions (e.g., the initial ranging region, the periodic ranging region, the CQICH region, the ACKCH region, and the sounding region) to '1' and informs the scheduler 300 of the set period. Accordingly, the scheduler 300 controls the MAP generator 302 to transmit the allocation information of the initial ranging region in every frame. The allocation information of the initial ranging region is transmitted in every frame so that the handed over MS can access its target BS without additional delay. The initial ranging region is merely an example. If necessary, the allocation information of other control region can be transmitted by setting its transmission period to a value smaller than N, not necessarily to '1', which is the transmission period of the UL control region allocation information.

According to another embodiment of the present invention, the UL control region information manager 316 generates a broadcasting message including the UL control region allocation information collected from the adjacent BSs. The broadcasting message is broadcast to MSs by certain periods or when the information is updated. For example, the broadcasting message may be NeighBoR ADVertisement (NBR-ADV) message, and include the UL control region allocation information with respect to each adjacent BS as shown in Table 1.

TABLE 1

| Name | Type (1 byte) | Length | Value |
|---|---|---|---|
| Fast Feedback Region | 210 | 5 | Bit #0~31, Contains same fields as in the FAST FEEDBACK Allocation IE in Table 295a: OFDMA symbol offset(8bits), subchannel offset(7 bits), No. OFDMA symbols(7 bits), No. subchannels(7 bits), Reserved(3bits) Bit #32~34, Parameter d that defines Periodicity in $2^d$ Frames Bit #36~39, Allocation phase expressed in Frames |
| HARQ Ack Region | 211 | 4 | Bit #0~23, Contains the following fields as in the HARQ ACKCH region allocation IE in Table 302t: |

TABLE 1-continued

| Name | Type (1 byte) | Length | Value |
|---|---|---|---|
| | | | OFDMA Symbol offset(8 bits), subchannel offset(7 bits), No. OFDMA symbols(5 bits), No. Subchannels(4 bits)<br>Bit #24~26, Parameter d that defines Periodicity in $2^d$ Frames<br>Bit #27~31, Allocation phase expressed in Frames |
| Ranging Region | 212 | 5/10/15/20 | The value of TLV consists of up to 4 concatenated sections(one section per Raging method), each having the following structure:<br>Bit #0~31, Contains same fields as in the section for UIUC = 12 in Table 287: OFDMA symbol offset(8 bits), subchannel offset(7 bits), No. OFDMA symbols(7 bits), No. subchannels(7 bits), Raging method(2 bits), Dedicated ranging indicator = '0'<br>Bit #32~34, Parameter d that defines Periodicity in $2^d$ Frames<br>Bit #35~39, Allocation phase expressed in Frames |
| Sounding Region | 213 | 5/10 | For 5 bytes per each sounding region<br>Bit #0~31, Contains the following fields as in the PAPR reduction/Safety zone/Sounding zone allocation IE in Table 289: OFDMA symbol offset(8 bits), Subchannel offset(7 bits), No. OFDMA symbols(7 bits), No. subchannels(7 bits), PAPR Reduction/Safety Zone(1 bits), Sounding Zone bit = '1', Reserved(1 bits)<br>Bit #32~34, Parameter d that defines Periodicity in $2^d$ Frames<br>Bit #36~39, Allocation phase expressed in Frames |

In Table 1, NBR-ADV message can include at least one UL control region allocation information block with respect to each adjacent BS. Herein, the UL control region includes the fast feedback region where the CQI is fed back, the Hybrid Automatic Repeat reQuest (HARQ) ACKnowledgment (Ack) region where a response signal of the HARQ is fed back, the ranging region (the initial ranging region, the HO ranging region, the periodic ranging region, and bandwidth request ranging region, etc), and the sounding region where the sounding signal is transmitted. Each UL control region allocation information block can include resource allocation information (Allocation Information Element (IE)), allocation periodicity information (Parameter d) of the UL control region, and allocation phase information (Allocation Phase) for designating the start point to which the allocation period is applied.

If UpLink Channel Descriptor (UCD) Configuration Change Count (CCC) value of the adjacent BS, which is acquired by the MS from the NBR-ADV message, differs from a UCD CCC value acquired from a MAP message of the of the adjacent BS, the MS waits until the CCC value of the UCD message broadcast from the adjacent BS matches the UCD CCC value recorded in the MAP message of the adjacent BS and performs a corresponding operation (e.g., UL signaling) when the UCD CCC values match. In doing so, the MS attempts to access to the adjacent BS using the UL control region allocation information received from the adjacent BS.

Figure 4:
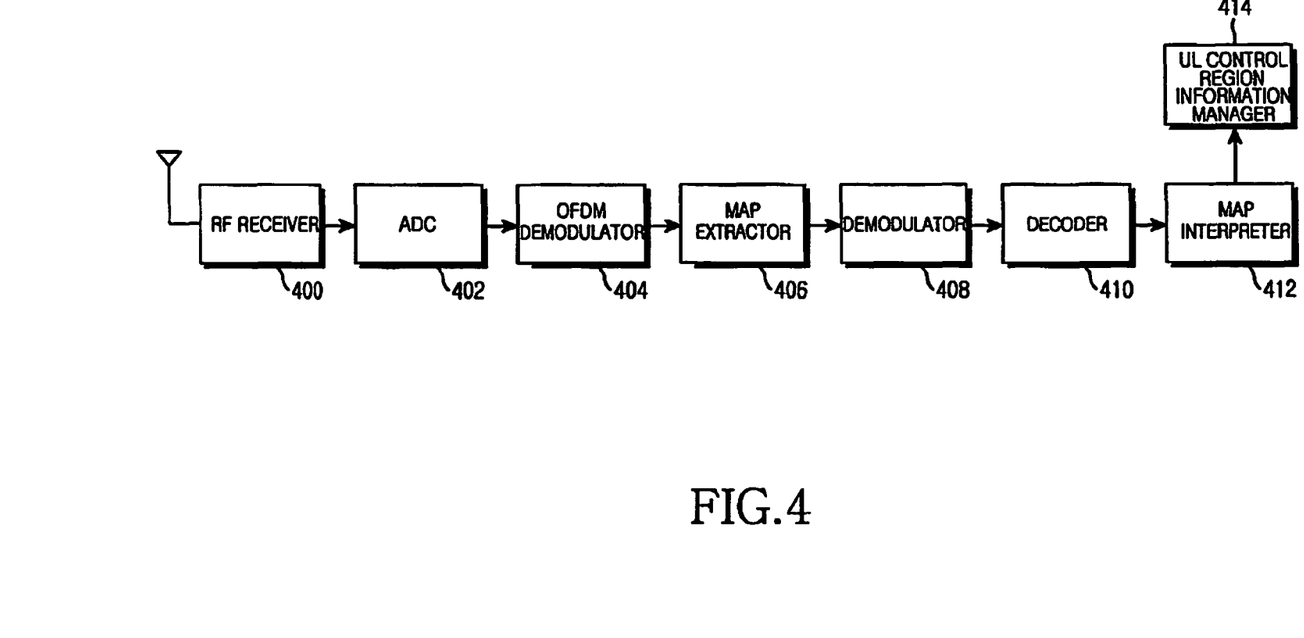
FIG. 4 illustrates constitution of an MS in a BWA communication system according to the present invention.

FIG. 4 illustrates constitution of an MS in the BWA communication system according to the present invention.

MS of FIG. 4 includes an RF receiver 400, an Analog-to-Digital Converter (ADC) 402, an OFDM demodulator 404, a MAP extractor 406, a demodulator 408, a decoder 410, MAP interpreter 412, and a UL control region information manager 414.

The RF receiver 400 of FIG. 4 converts the RF signal received from BS to a baseband analog signal and outputs the baseband signal. The ADC 402 converts the baseband signal fed from the RF receiver 400 to digital sample data and outputs the digital sample data. The OFDM demodulator 404 outputs frequency-domain data by OFDM-demodulating the sample data provided from the ADC 402. Herein, the OFDM demodulation includes CP elimination, Fast Fourier Transform (FFT) operation, etc.

The MAP extractor 406 extracts and outputs MAP bursts received over a preset region of the frame from the data fed from the OFDM demodulator 404. The demodulator 408 demodulates and outputs the data fed from the MAP extractor 406 using a prescribed scheme. The decoder 410 restores MAP information by decoding the data fed from the demodulator 408. In doing so, the decoder 410 examines a Cyclic Redundancy Check (CRC) in relation to the restored MAP information. When the CRC check is successful, the decoder 410 provides the MAP information to the MAP interpreter 412.

The MAP interpreter 412 interprets the MAP information fed from the decoder 410, and controls overall transmission and reception of the MS according to the MAP information. When receiving UL control region allocation information according to the interpretation result of the MAP information, the MAP interpreter 412 provides the UL control region allocation information to the UL control region information manager 414.

The UL control region information manager 414 manages the UL control region allocation information received from the BS by certain periods, i.e., the UL control region information manager 414 updates the information every time the UL control region allocation information is received from the BS. A control signal transmission, although not shown in the drawing, transmits UL signaling (e.g., ranging, CQI, ACK, etc. to the BS using the managed UL control region allocation information.

According to another embodiment of the present invention, the UL control region information manager 414 manages UL control region allocation information of adjacent BSs, which are received from the BS. For instance, the UL control region allocation information of the adjacent BSs can be acquired using NBR-ADV messages. In this case, MS in the handover can send the ranging code directly to the target BS because it already knows the initial ranging region of the target BS.

Figure 5:
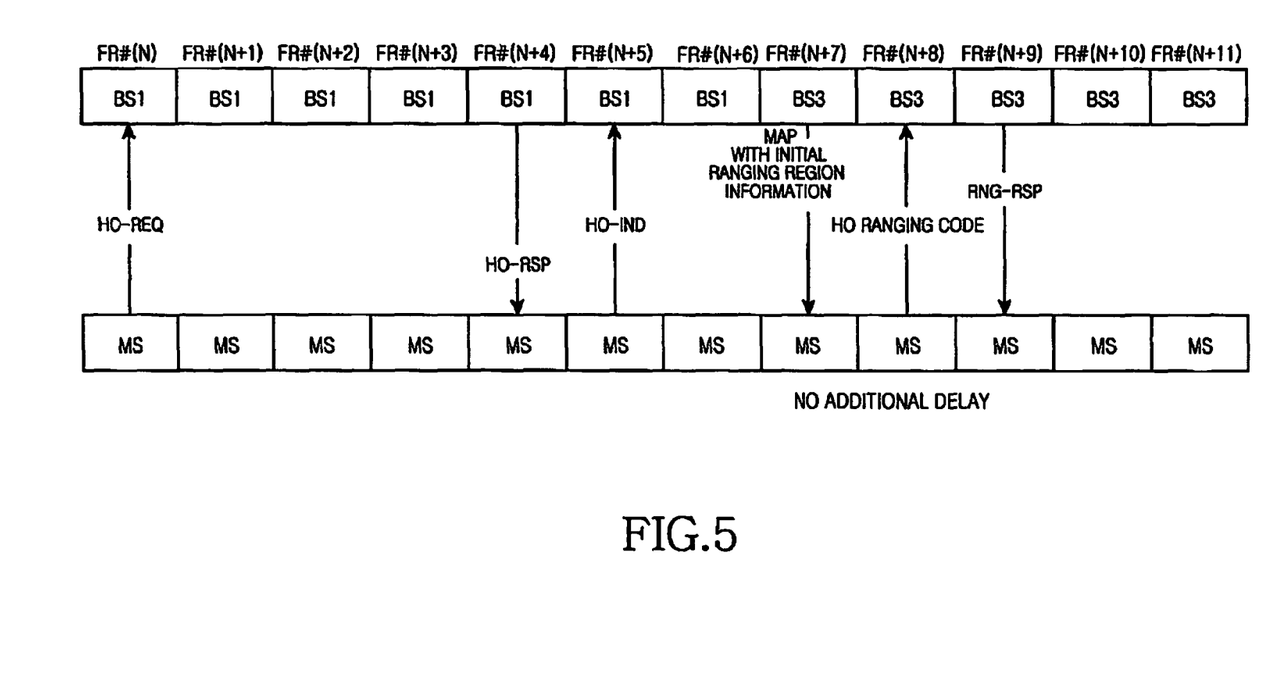
FIG. 5 illustrates handover latency in MAP information transmission according to the present invention.

FIG. 5 illustrates handover latency in MAP information transmission according to the present invention.

The BS compares the UL control regions of adjacent BSs with its UL control region. When the regions are the same, the BS periodically transmits allocation information of every UL region. When any one of the adjacent BSs has a different UL control region, the BS transmits allocation information of the initial ranging region in every frame and periodically transmits allocation information of the remaining control regions. In this situation, the handover process of the MS is described below.

In FIG. 5, when determining the necessity of the handover, MS sends an HO-REQ message to a BS1 in an n-th frame Fr#(n). The BS1 sends an HO-RSP message to the MS over an (n+4)-th frame in response to the HO-REQ message. The MS sends an HO-IND message to the BS1 over an (n+5)-th frame and attempts to access a BS3.

At this time, when UL control regions of the BS1 and the BS3 are the same, the MS transmits HO ranging code directly to the BS3 using UL control region information acquired from the BS1. Thus, there occurs no additional HO delay. When the UL control regions of the BS1 and the BS3 are different from each other, the BS3 transmits initial ranging region information in every frame. Accordingly, the MS can receive the initial ranging region information of the BS3 over an (n+7)-th frame. Namely, since the MS can send the HO ranging code right after the handover, additional HO latency does not occur.

Figure 6:
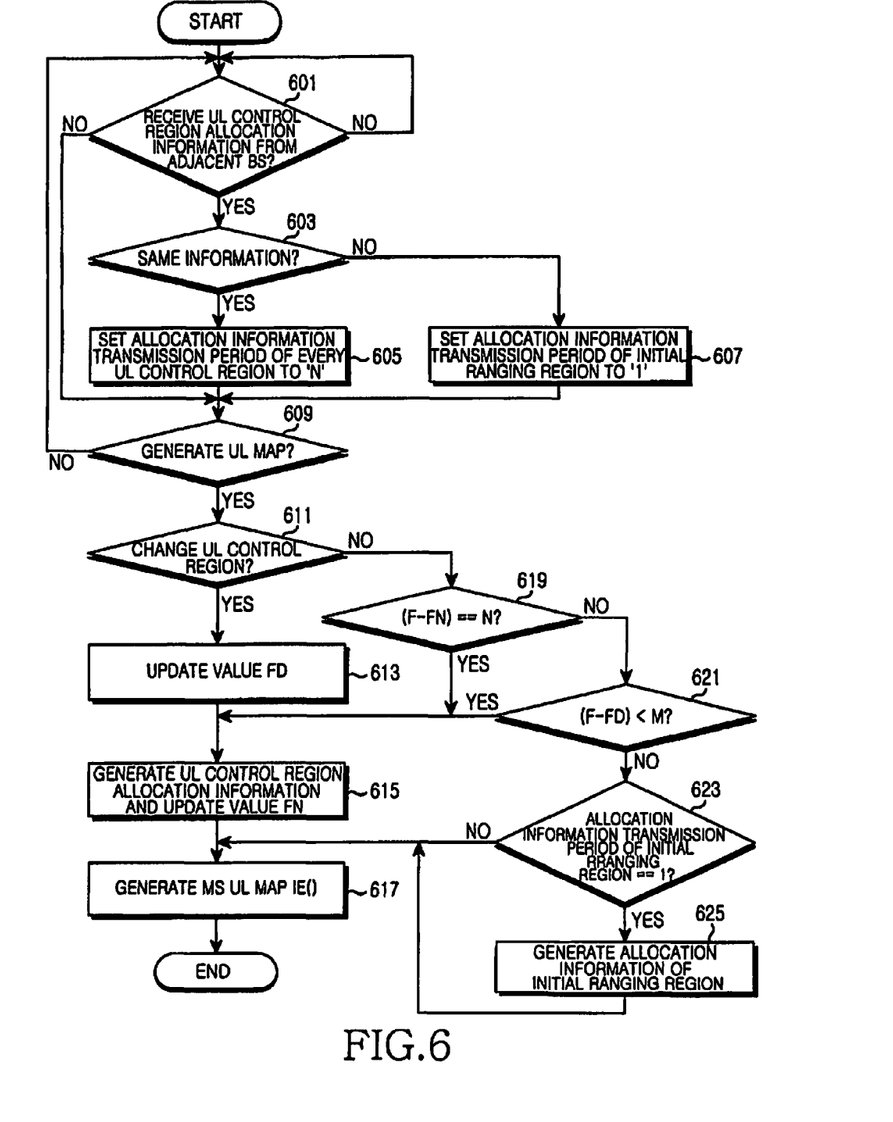
FIG. 6 is a flow chart illustrating BS operations in the BWA system according to the present invention.

FIG. 6 illustrates operations of a BS in the BWA system according to the present invention.

A BS of FIG. 6 checks whether UL control region allocation information is received from an adjacent BS in step 601. When not receiving the UL control region allocation information from the adjacent BS, the BS proceeds to step 609. When receiving the UL control region allocation information, the BS proceeds to step 603.

In step 603, the BS compares the received UL control region allocation information with its information. When the information is the same, the BS sets an allocation information transmission period of every UL control region to a preset value N in step 605 and then proceeds to step 609. When the information is different from each other, the BS sets an allocation information transmission period of the initial ranging region of the UL control regions to '1' in step 607 and then goes to step 609. That is, the BS sets to transmit the allocation information of the initial ranging region in every frame.

In step 609, the BS checks whether it is time to generate a UL MAP. When it is not a UL MAP generation time, the BS returns to step 601 and performs the subsequent steps. When detecting the UL MAP generation time, the BS determines whether the UL control region is changed based on the scheduling results step 611.

When the UL control region is changed, the BS updates a variable 'Fd' to a frame number of the changed UL control region in step 613. Next, the BS generates the UL control region allocation information and updates a variable 'Fn' to a frame number, which carries the UL control region allocation information in step 615. The BS finishes the UL MAP generation by generating MS UL MAP IEO in step 617.

By contrast, when determining that the UL control region information is not changed in step 611, the BS examines whether a difference between the value 'F', which indicates the current frame number and a value 'Fn', which is equal to the transmission period value 'N' in step 619. When the two values are equal to each other, the BS determines that it is the corresponding transmission period and then goes to step 615.

When the two values are different from each other, the BS checks whether a difference between the value 'F' and the value 'Fd' is smaller than a certain value 'M' in step 621. When the difference is smaller than the value 'M', the BS generates UL control region allocation information in step 615. Since the value 'Fd' is the frame number of the changed UL control region and the value 'M' is a constant, the UL control region information is transmitted in success over 'M'-ary frames after the region information is changed.

When the difference between the value 'F' and the value 'Fd' is greater than or equal to the value 'M', the BS checks whether the allocation information transmission period of the initial ranging region is set to '1' in step 623. When the allocation information transmission period of the initial ranging region is not '1', the BS finishes the UL MAP generation by generating MS UL MAP IEO in step 617. By contrast, when the allocation information transmission period of the initial ranging region is '1', the BS generates allocation information of the initial ranging region in step 625 and then goes to step 617. That is, when the allocation information transmission period of the initial ranging region is '1', the BS transmits the allocation information of the initial ranging region in every frame regardless of the allocation information transmission periods of the other UL control regions.

Figure 7:
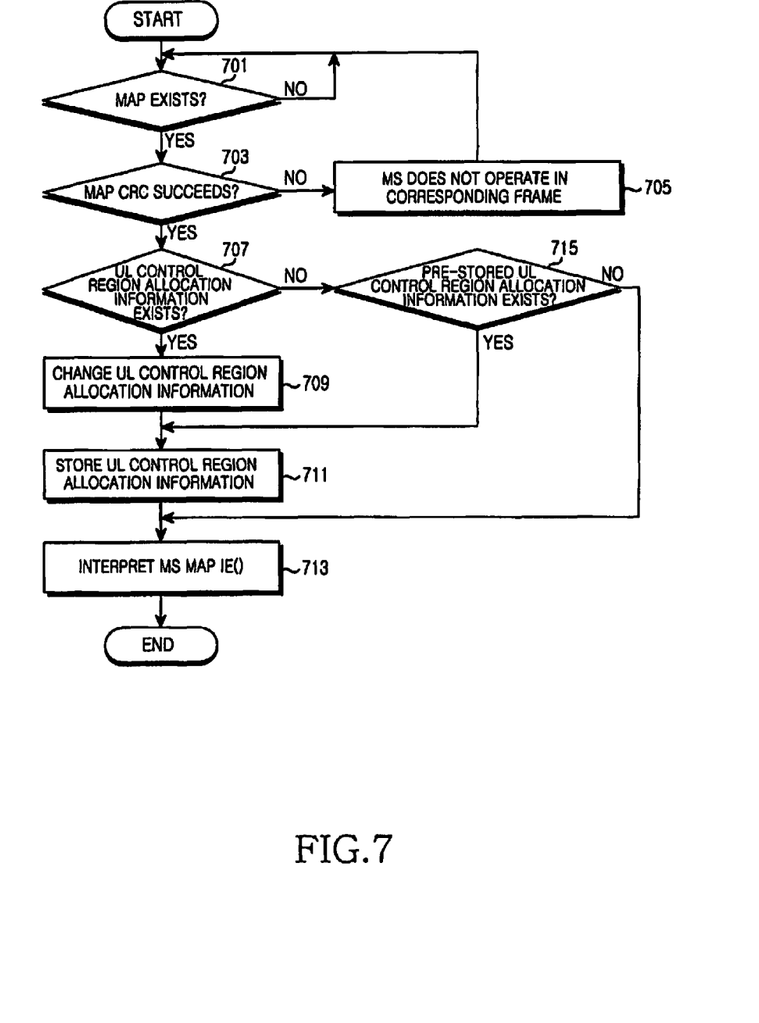
FIG. 7 is a flow chart illustrating MS operations in the BWA system according to the present invention.

FIG. 7 illustrates operations of an MS in the BWA system according to the present invention.

An MS of FIG. 7 checks whether a MAP is received in step 701. When receiving the MAP, the MS checks a CRC of the received MAP and determines whether the CRC check is successful in step 703. If the CRC check fails, the MS does not operate in the corresponding frame in step 705 and returns to step 701.

If the CRC check succeeds, the MS determines whether UL control region information exists in the MAP in step 707. The MAP may not contain the allocation information of the UL control region, or may contain at least one UL control region allocation information block.

When the UL control region allocation information exists in the MAP, the MS changes UL control region allocation information to the received information in step 709, and stores the changed UL control region allocation information in step 711. Next, the MS interprets the MAP information by interpreting a MS MAP IEO in step 713.

Meanwhile, upon determining the absence of the UL control region allocation information in the MAP in step 707, the MS determines whether there exists pre-stored UL control region allocation information in step 715. When there is the pre-stored information, the MS sets to keep using the pre-stored information in step 711. By contrast, when there is no pre-stored information, the MS interprets MAP information by interpreting the MS MAP IEO in step 713.

Figure 8:
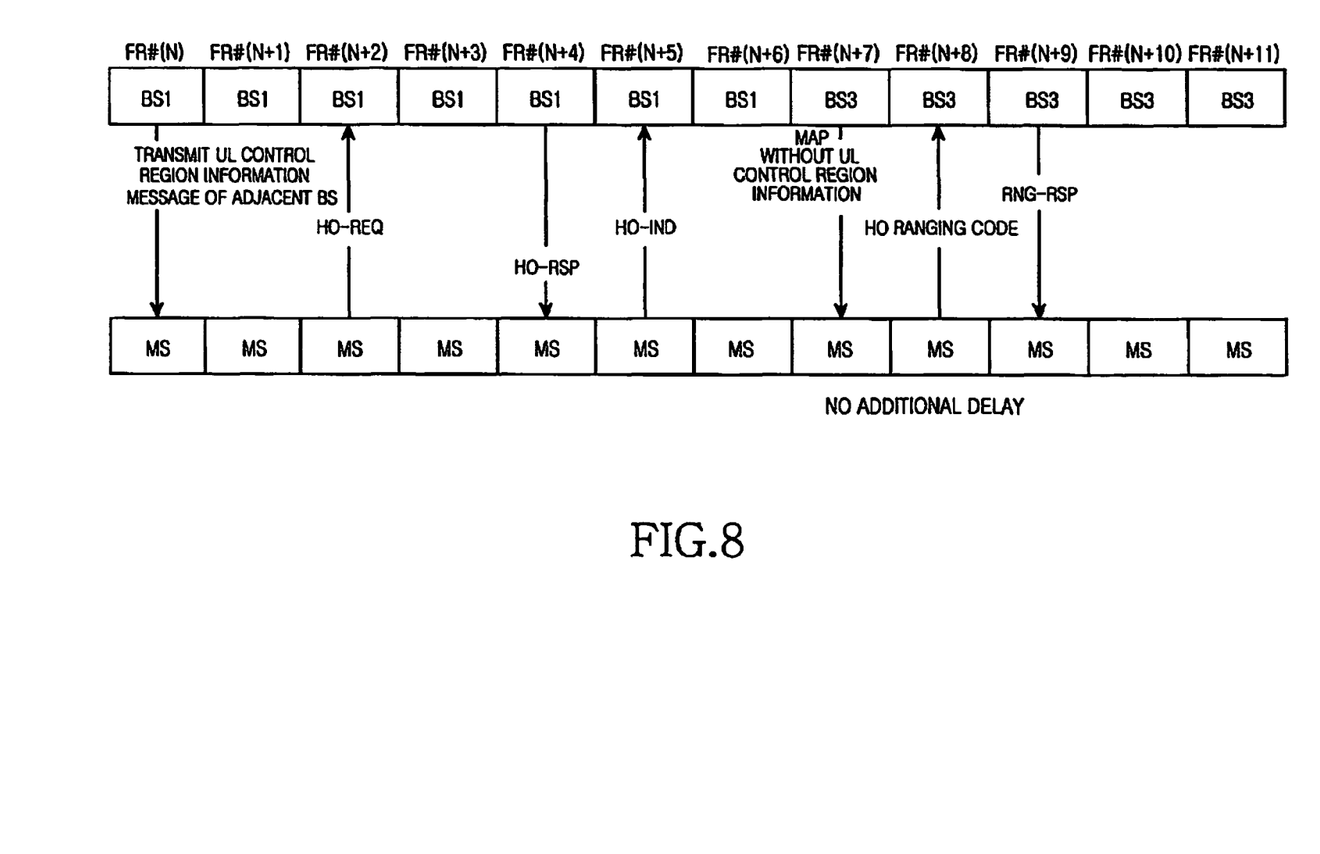
FIG. 8 illustrates handover latency in MAP information transmission according to the present invention.

FIG. 8 illustrates handover latency in MAP information transmission according to the present invention.

According to another embodiment of the present invention, BS broadcasts a broadcasting message (e.g., an NBR-ADV message) including UL control region allocation information aggregated from adjacent BSs to MSs by certain periods or when information is updated. That is, an MS can acquire the control region allocation information of the adjacent BSs from the broadcasting message received from the serving BS. The MS handover procedure, according to this situation, is illustrated below.

An MS of FIG. 8 receives a broadcast message including UL control region allocation information of adjacent BSs from a BS1 in an n-th frame. Namely, the MS can acquire UL control region allocation information of the target BS in advance of the handover.

When determining necessity of the handover, the MS transmits an HO-REQ message to the BS1 in an (n+2)-th frame. The BS1 transmits a HO-RSP message to the MS in response to the HO-REQ message in an (n+4)-th frame. Next, the MS transmits an HO-IND message to the BS1 in an (n+5)-th frame and attempts to access a BS3.

In doing so, even though a frame (an (n+7)-th frame) first received at the MS from the BS3 after the handover does not include UL control region information due to its periodic transmission, the MS can transmit an HO ranging code to the BS3 right in an (n+8)-th frame because it already knows the UL control region information of the BS3. In other words, since the MS can transmit the HO ranging code right after the handover, additional handover delay does not occur.

Figure 9:
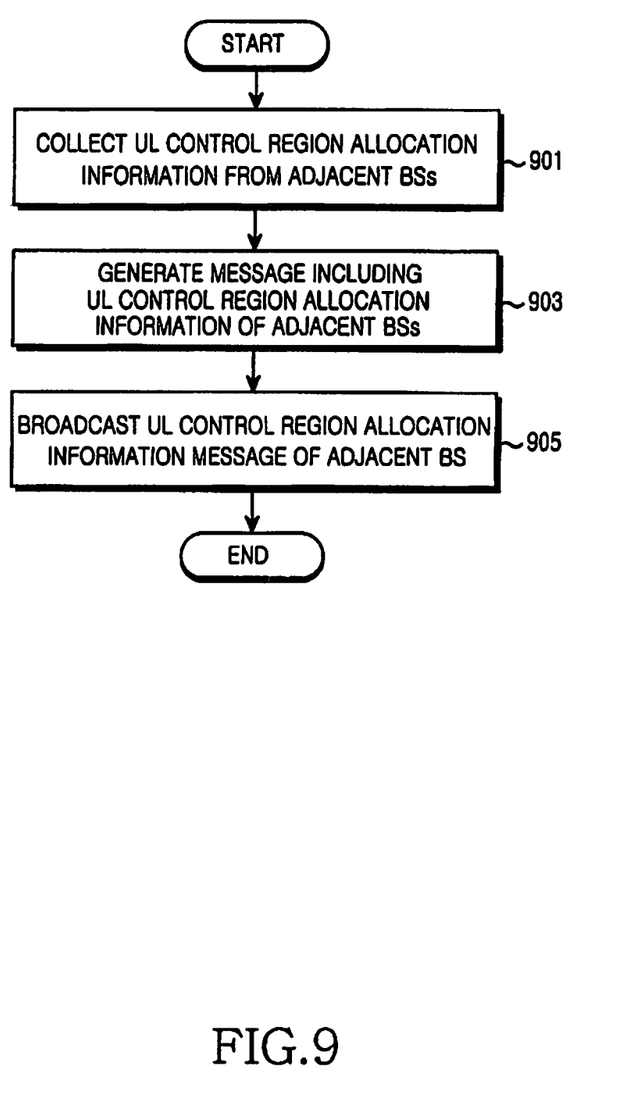
FIG. 9 is a flow chart illustrating BS operations for broadcasting UL control region allocation information of adjacent BSs in the BWA system according to the present invention.

FIG. 9 illustrates operations of a BS for broadcasting UL control region allocation information of adjacent BSs in the BWA system according to the present invention.

In FIG. 9, a BS aggregates UL control region allocation information from adjacent BSs over a backbone network in step 901.

After gathering the UL control region allocation information of the adjacent BSs, the BS generates a broadcasting message including the UL control region allocation information of the adjacent BSs in step 903. For example, the broadcasting message can be an NBR-ADV for broadcasting information of adjacent BSs. Mostly, when Uplink Channel Descriptor (UCD) information of the BS is different from that of the adjacent BS, the NBR-ADV message can include UCD information of the corresponding adjacent BS. In this respect, UL control region allocation information of the adjacent BS, which is included in the NBR-ADV message, may be UCD information of the corresponding adjacent BS.

After generating the message, the BS broadcasts the message to MSs in step 905. These operations can be performed periodically or when an event (UL control region information exchange) between the adjacent BSs occurs.

Figure 10:
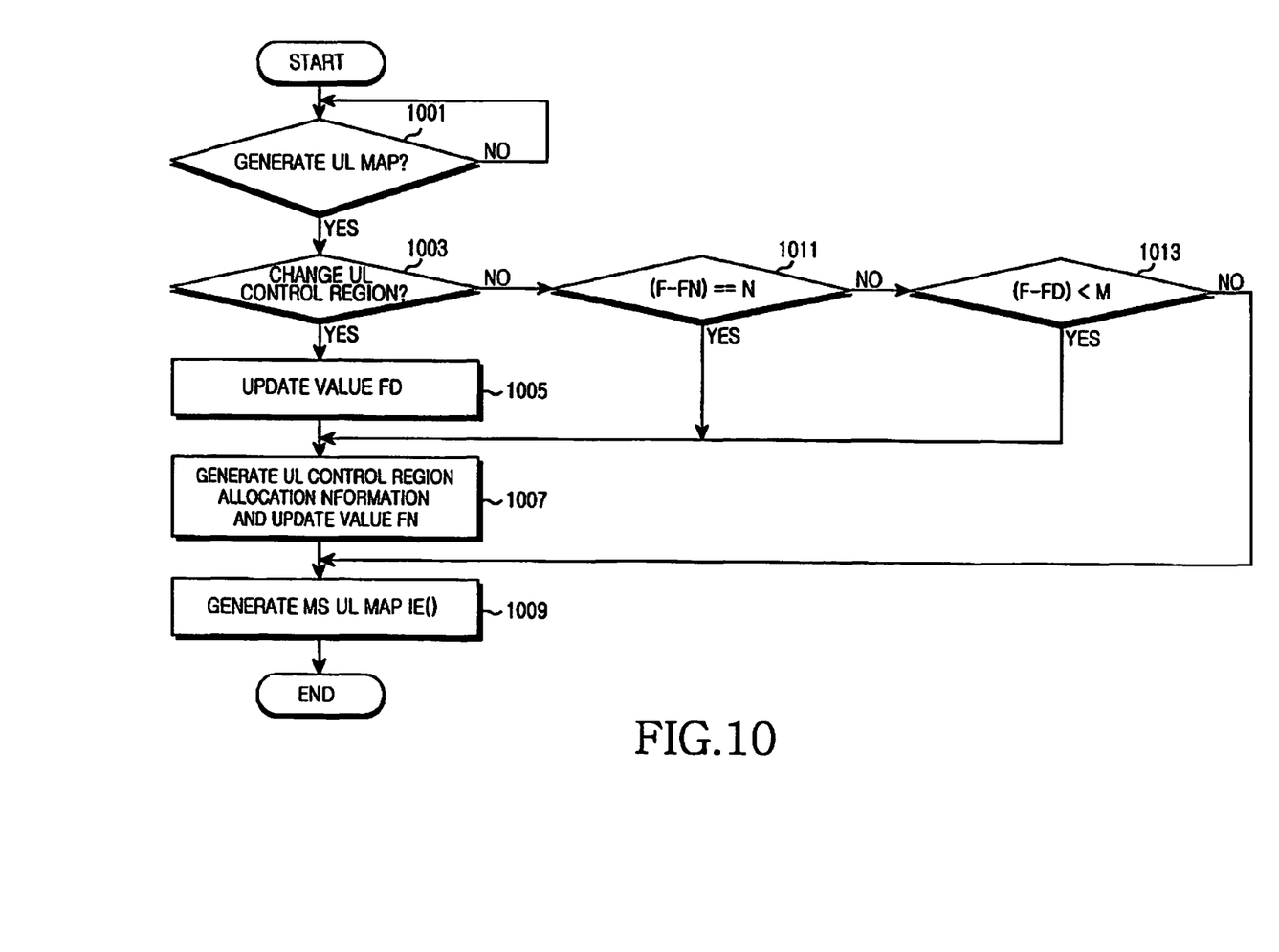
FIG. 10 is a flow chart illustrating BS operations for generating MAP information in the BWA system according to the present invention.

FIG. 10 illustrates operations of a BS for generating MAP information in the BWA system according to the present invention.

The BS of FIG. 10 checks whether a current time is a UL MAP generation time in step 1001. When detecting the UL MAP generation time, the BS determines whether a UL control region is changed based on a scheduling result in step 1003.

When the UL control region is changed, the BS updates a variable 'Fd' a frame number of the changed UL control region in step 1005. Next, the BS generates UL control region allocation information and updates a variable 'Fn' to the frame number, which carries the UL control region allocation information in step 1007. In step 1009, the BS finishes the UL MAP generation by generating MS UL MAP IEO.

By contrast, when determining no change of the UL control region in step 1003, the BS checks whether a difference between a value 'F' indicative of the current frame number and a value 'Fn' is equal to a transmission period value N in step 1011. When the difference equals to the value 'N', the BS determines the corresponding transmission period and proceeds to step 1007.

When the difference is different from the value 'N', the BS checks whether a difference between the value 'F' and the value 'Fd' is smaller than a certain value 'M' in step 1013. When the difference is less than the value 'M', the BS goes to step 1007 and generates the UL control region allocation information. Herein, the value 'Fd' is the frame number of the changed UL control region, and the value 'M' is a constant. Hence, the UL control region allocation information is transmitted over 'M'-ary frames in succession after the region information is changed.

When the difference between the value 'F' and the value 'Fd' is greater than or equal to the value 'M', the BS finishes the UL MAP generation by generating MS UL MAP IEO in step 1009.

As such, the MS operations for receiving and interpreting the MAP information are the same as in FIG. 7, and thus shall not be described in more detail. That is, the MS acquires the UL control region allocation information of the serving BS by interpreting the MAP as shown in FIG. 7.

According to another embodiment of the present invention, the MS acquires the UL control region allocation information of the adjacent BSs in advance, which is explained in detail.

Figure 11:
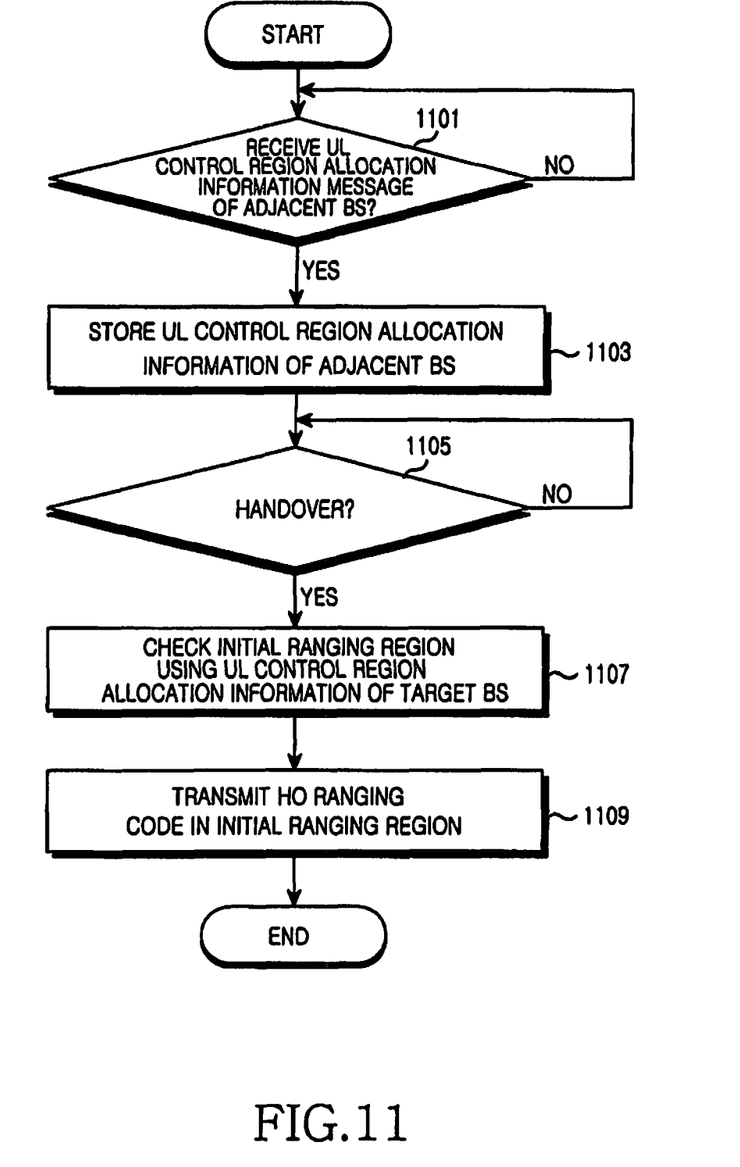
FIG. 11 is a flow chart illustrating MS operations for acquiring UL control region allocation information of adjacent BSs in the BWA system according to the present invention.

FIG. 11 illustrates operations of an MS for acquiring UL control region allocation information of adjacent BSs in the BWA system according to the present invention.

An MS of FIG. 11 checks whether a broadcasting message including UL control region allocation information of adjacent BSs is received in step 1101. For example, the broadcasting message can be NBR-ADV for broadcasting information of the adjacent BSs and can include UL control region allocation information as shown in Table 1.

When receiving the broadcasting message, the MS extracts and stores the UL control region allocation information of the adjacent BSs from the broadcasting message in step 1103. In step 1105, the MS checks whether handover to a target BS is determined. For instance, the handover can be determined when the MS sends an HO-IND message to the serving BS as aforementioned.

Determining the handover, the MS acquires UL control region allocation information corresponding to the target BS among the pre-stored UL control region allocation information of the adjacent BSs, and confirms the initial ranging region of the target BS according to the acquired information in step 1107.

After confirming the initial ranging region of the target BS, the MS attempts to access the target BS by transmitting an HO ranging code in the initial ranging region in step 1109.

As set forth above, since the BS transmits the UL control region information in every N frame at base and when the UL control region information is changed, the size of the control information (MAP) can be reduced. As the reduced MAP information leads to the increase of the DL data burst region, the cell capacity of the system can be raised. Further, the handed MS can promptly enter the coverage of the target BS by addressing the additional handover delay, which results from the periodic transmission of the UL control region information.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Base Station (BS) in a Broadband Wireless Access (BWA) system, comprising:
   a manager for managing UpLink (UL) control region allocation information of adjacent BSs;
   a scheduler for scheduling resources and controlling periodic transmission of UL control region allocation information when a UL control region of the BS is the same as UL control regions of the adjacent BSs, and for controlling allocation information transmission of an initial ranging region in every frame and periodic transmission of UL control region allocation information of the remaining control regions when any one of the adjacent BSs has a different UL control region; and
   a control information generator for periodically generating UL control region allocation information under the control of the scheduler.

2. The BS of claim 1, wherein the UL control region allocation information is MAP information.

3. The BS of claim 1, further comprising:
a backbone interface for exchanging UL control region allocation information with the adjacent BSs.

4. The BS of claim 1, further comprising:
an encoder for encoding control information fed from the control information generator;
a modulator for modulating data fed from the encoder;
a resource mapper for mapping data fed from the modulator to a preset resource;
an Orthogonal Frequency Division Multiplexing (OFDM) modulator for OFDM-modulating resource-mapped data fed from the resource mapper; and
a Radio Frequency (RF) transmitter for converting data fed from the OFDM modulator to an RF signal and transmitting the RF signal.

5. The BS of claim 1, wherein the UL control region includes at least one of an initial ranging region, a handover ranging region, a periodic ranging region, a bandwidth request ranging region, a fast feedback region, a Hybrid Automatic Repeat reQuest (HARQ) ACKnowledgment (Ack) region, and a sounding region.

6. A Base Station (BS) in a Broadband Wireless Access (BWA) system, comprising:
a manager for collecting UpLink (UL) control region allocation information from adjacent BSs and generating a broadcasting message which includes the UL control region allocation information of the adjacent BSs; and
a transmitter for broadcasting the broadcasting message fed from the manager;
a scheduler for controlling periodic transmission of UL control region allocation information of the BS when a UL control region of the BS is the same as UL control regions of the adjacent BSs, and for controlling allocation information transmission of an initial ranging region in every frame and periodic transmission of UL control region allocation information of the remaining control regions when any one of the adjacent BSs has a different UL control region; and
a control information generator for periodically generating UL control region allocation information under the control of the scheduler.

7. The BS of claim 6, further comprising:
a backbone interface for exchanging UL control region allocation information with the adjacent BSs.

8. The BS of claim 6, wherein the broadcasting message is a NeighBoR ADVertisement (NBR-ADV) message for broadcasting information of the adjacent BSs.

9. The BS of claim 6, wherein the UL control region allocation information includes at least one of resource allocation information (allocation Information Element (IE)), allocation periodicity information of the UL control region, and allocation phase information for designating a start point to which the allocation period is applied.

10. The BS of claim 6, wherein the transmitter comprises:
an encoder for encoding the broadcasting message;
a modulator for modulating data fed from the encoder;
a resource mapper for mapping data fed from the modulator to a preset resource;
an Orthogonal Frequency Division Multiplexing (OFDM) modulator for OFDM-modulating resource-mapped data fed from the resource mapper; and
a Radio Frequency (RF) transmitter for converting data fed from the OFDM modulator to an RF signal and transmitting the RF signal.

11. The BS of claim 6, wherein the UL control region includes at least one of an initial ranging region, a handover ranging region, a periodic ranging region, a bandwidth request ranging region, a fast feedback region, a Hybrid Automatic Repeat reQuest (HARQ) ACKnowledgment (Ack) region, and a sounding region.

12. A communicating method of a Base Station (BS) in a Broadband Wireless Access (BWA) system, the method comprising:
collecting UpLink (UL) control region allocation information from adjacent BSs; and
when a UL control region of the BS is the same as UL control regions of the adjacent BSs, periodically transmitting UL control region allocation information,
when any one of the adjacent BSs has a different UL control region than the UL control region of the BS, controlling allocation information transmission of an initial ranging region in every frame and periodically transmitting UL control region allocation information of the remaining control regions.

13. The communicating method of claim 12, wherein the UL control region allocation information is MAP information.

14. The communicating method of claim 12, wherein the transmitting step comprises:
coding and modulating the UL control region allocation information;
Orthogonal Frequency Division Multiplexing (OFDM)-modulating the modulated data and
converting the OFDM-modulated data to a Radio Frequency (RF) signal and transmitting the RF signal.

15. The communicating method of claim 12, wherein the UL control region includes at least one of an initial ranging region, a handover ranging region, a periodic ranging region, a bandwidth request ranging region, a fast feedback region, a Hybrid Automatic Repeat reQuest (HARQ) ACKnowledgment (Ack) region, and a sounding region.

16. A communicating method of a Base Station (BS) in a Broadband Wireless Access (BWA) system, the method comprising:
collecting UpLink (UL) control region allocation information from adjacent BSs;
generating a broadcasting message which includes the UL control region allocation information of the adjacent BSs;
broadcasting the generated broadcasting message;
controlling periodic transmission of UL control region allocation information of the BS when a UL control region of the BS is the same as UL control regions of the adjacent BSs;
controlling allocation information transmission of an initial ranging region in every frame and periodic transmission of UL control region allocation information of the remaining control regions when any one of the adjacent BSs has a different UL control region; and
periodically generating UL control region allocation information under the control of the scheduler.

17. The communicating method of claim 16, further comprising:
setting a period of UL control region allocation information of the BS; and
periodically transmitting the UL control region allocation information according to the set periods.

18. The communicating method of claim 16, wherein the broadcasting message is a NeighBoR ADVertisement (NBR-ADV) message for broadcasting information of the adjacent BSs.

19. The communicating method of claim 16, wherein the UL control region allocation information includes at least one of resource allocation information (allocation IE), allocation periodicity information of the UL control region, and allocation phase information for designating a start point to which the allocation period is applied.

20. The communicating method of claim 16, wherein the broadcasting step comprises:
 coding and modulating the broadcasting message;
 Orthogonal Frequency Division Multiplexing (OFDM)-modulating the modulated data and
 converting the OFDM-modulated data to a Radio Frequency (RF) signal and transmitting the RF signal.

21. The communicating method of claim 16, wherein the UL control region includes at least one of an initial ranging region, a handover ranging region, a periodic ranging region, a bandwidth request ranging region, a fast feedback region, a Hybrid Automatic Repeat reQuest (HARQ) ACKnowledgment (Ack) region, and a sounding region.

* * * * *